United States Patent
Wilson

(10) Patent No.: US 7,451,021 B2
(45) Date of Patent: Nov. 11, 2008

(54) MODEL-BASED FAULT DETECTION AND ISOLATION FOR INTERMITTENTLY ACTIVE FAULTS WITH APPLICATION TO MOTION-BASED THRUSTER FAULT DETECTION AND ISOLATION FOR SPACECRAFT

(76) Inventor: Edward Wilson, 454 Barkentine La., Redwood City, CA (US) 94065-1126

( * ) Notice: Subject to any disclaimer, the term of this patent is extended or adjusted under 35 U.S.C. 154(b) by 420 days.

(21) Appl. No.: 10/841,675

(22) Filed: May 6, 2004

(65) Prior Publication Data

US 2005/0143873 A1 Jun. 30, 2005

Related U.S. Application Data

(60) Provisional application No. 60/468,411, filed on May 6, 2003.

(51) Int. Cl.
*G06F 17/00* (2006.01)
(52) U.S. Cl. .......................................... 701/9; 318/563
(58) Field of Classification Search ...................... 701/1, 701/4, 29, 34, 35; 318/563, 564; 244/75.1, 244/194
See application file for complete search history.

(56) References Cited

U.S. PATENT DOCUMENTS

| | | | | |
|---|---|---|---|---|
| 4,355,358 A * | 10/1982 | Clelford et al. ................. | 701/3 |
| 4,847,795 A * | 7/1989 | Baker et al. ................... | 702/184 |
| 4,914,598 A * | 4/1990 | Krogmann et al. ............. | 701/11 |
| 5,293,323 A * | 3/1994 | Doskocil et al. ............. | 702/185 |
| 5,297,052 A * | 3/1994 | McIntyre et al. ............. | 701/220 |
| 5,442,961 A * | 8/1995 | Bozeman, Jr. ................ | 73/660 |
| 5,452,869 A * | 9/1995 | Basuthakur et al. .......... | 244/164 |
| 5,537,644 A * | 7/1996 | Hamilton et al. .............. | 706/52 |
| 5,808,919 A * | 9/1998 | Preist et al. .................. | 702/183 |
| 5,951,609 A * | 9/1999 | Hanson et al. ................ | 701/13 |
| 6,389,335 B1 * | 5/2002 | Vos ................................ | 701/4 |
| 6,532,392 B1 * | 3/2003 | Eryurek et al. ................ | 700/54 |
| 6,662,089 B2 * | 12/2003 | Felke et al. .................... | 701/29 |
| 6,898,554 B2 * | 5/2005 | Jaw et al. ..................... | 702/185 |
| 7,027,953 B2 * | 4/2006 | Klein ........................... | 702/184 |
| 2004/0176887 A1 * | 9/2004 | Kent et al. ..................... | 701/30 |

* cited by examiner

*Primary Examiner*—Dalena Tran

(57) ABSTRACT

The present invention is a method for detecting and isolating fault modes in a system having a model describing its behavior and regularly sampled measurements. The models are used to calculate past and present deviations from measurements that would result with no faults present, as well as with one or more potential fault modes present. Algorithms that calculate and store these deviations, along with memory of when said faults, if present, would have an effect on the said actual measurements, are used to detect when a fault is present. Related algorithms are used to exonerate false fault modes and finally to isolate the true fault mode. This invention is presented with application to detection and isolation of thruster faults for a thruster-controlled spacecraft. As a supporting aspect of the invention, a novel, effective, and efficient filtering method for estimating the derivative of a noisy signal is presented.

11 Claims, 5 Drawing Sheets

MODEL-BASED FAULT DETECTION AND ISOLATION FOR INTERMITTENTLY ACTIVE FAULTS WITH APPLICATION TO MOTION-BASED THRUSTER FAULT DETECTION AND ISOLATION FOR SPACECRAFT

This application claims the benefit of the filing date of the previously filed provisional patent application, No. 60/468,411, filed on May 6, 2003.

FEDERALLY SPONSORED RESEARCH

This invention was made with Government support under contract number NAS2-00065 awarded by NASA. The Government has certain rights in the invention.

COMPUTER PROGRAM LISTING COMPACT DISK APPENDIX

Selected files used to implement a simulation of the invention, as applied to a thruster controlled spacecraft, are provided in MATLAB m-code on CD-R. All code is copyright Edward Wilson. One original and one identical copy are provided. Machine format: IBM PC/XT/AT, or compatibles. Operating system compatibility: MS-Windows. Line Terminator: ASCII Carriage return plus ASCII Line Feed. Control codes: none. Compression: uncompressed data. A printed listing of the files on the CD-R is also provided as an appendix to this specification.

BACKGROUND OF THE INVENTION

1. Background—Field of the Invention

The present invention relates generally to information processing systems that are used to detect and isolate anomalies (or fault detection and isolation—FDI), and more specifically to an information processing system that monitors motion-related sensors to accurately detect and isolate the presence of thruster faults. Whereas FDI is a broad field, this invention presents a solution that is especially valuable when certain aspects are present: (1) when the faults that may appear are discrete and finite in number; (2) faults occur and appear abruptly and are not intermittent; (3) the effect of the faults are intermittently present (active) or absent (inactive) at known times; (4) the measurements of these effects are imprecise due to the complexity of the governing physics and presence of sensor noise and disturbances. Although the invention has applicability beyond, it was developed to solve a problem with these attributes: the detection (determining that a fault has occurred) and isolation (determining the exact type and location of the fault) of hard, abrupt, spacecraft thruster faults using only information from existing navigation sensors such as gyroscopes (gyros), accelerometers, star trackers, video cameras, sun sensors, horizon sensors, or other instruments whose output is affected by motions of the spacecraft.

The solution approach falls under the classification of model-based diagnosis; in which models of the system in its nominal and (multiple) failed conditions are used to generate predictions of the system state variables or sensor outputs. Calculation and analysis of the deviations of the measurements from predicted values is performed to detect and isolate the correct fault mode from the list of possible modes.

2. Background—Prior Art

R. Isermann, in "Process Fault Detection Based on Modeling and Estimation Methods—A Survey," *Automatica*, Vol. 20, No. 4, pp. 387-404, 1984, presents several FDI approaches that perform well on a variety of applications. However, the on-off nature of the thrusters present in the class of applications addressed here limits the viability of many general-purpose methods. For example, if a thruster has failed off, it will appear to be working correctly at all times that it is not commanded to fire. The present invention presents a general approach for this class of problems.

The most common approach to detect and isolate spacecraft thruster faults is to install pressure, temperature, and electrical sensors at the thrusters. The use of these additional sensors makes the FDI logic very simple and robust, since they can more directly detect when a thruster is producing thrust. However, the need for additional sensors adds to the cost, complexity, mass, and volume requirements of the spacecraft. This type of system is used, for example, on NASA's Space Shuttle Orbiter. If such extensive sensing is not possible, most systems do not have automatic on-line thruster FDI capability.

Deyst, J. J. and Deckert, J. C. proposed, and developed in simulation, a maximum-likelihood based approach for detecting leaking thrusters for the Space Shuttle orbiter's RCS jets in "Maximum likelihood failure detection techniques applied to the Shuttle RCS jets," *Journal of Spacecraft and Rockets*, vol. 13, no. 2, 65-74, February 1976. The method for detecting soft failures was also extended to detect hard RCS jet failures. It was tested and found to not have sufficient tolerance for model uncertainty and sensor noise to provide acceptable accuracy for example applications. However, the maximum-likelihood method presented in that work serves as the core upon which this invention builds, increasing the accuracy by using information from all prior time.

Lee, A. Y. and Brown, M. J. developed "A model-based thruster leakage monitor for the Cassini spacecraft," In *Proceedings of the American Control Conference*, 1998, vol. 2, pp 902-904, 1998. Unlike the present invention, this was aimed at detecting constant leaks, not failures that would cause varying effects depending on whether the thrusters are commanded to fire or not.

Wilson, E. and Rock, S. M., in "Reconfigurable control of a free-flying space robot using neural networks," Proceedings of the American Control Conference, Seattle Wash., June 1995, developed an FDI method based on exponentially weighted recursive least squares estimation using accelerometer and angular rate sensors. As with the approach of Deyst and Deckert, this approach was found to have limited accuracy, as compared to the system presented here.

BACKGROUND—OBJECTS AND ADVANTAGES

Disadvantages of the prior art are that it either requires the use of additional sensors, or does not provide the accuracy required of many thruster FDI applications. What is needed is a system that provides FDI that is accurate and timely, without requiring additional special purpose sensors. If existing navigational sensors can be used, then the FDI can be performed with a software-only on-board implementation, or from the ground, based on telemetered sensor data. Hard, abrupt, thruster failures resulting from a single point of failure (in valves, plumbing, electronics, etc.) are to be monitored. These can include single- or (simultaneously appearing) multiple-jet failures in either a failed-on or failed-off condition.

BRIEF SUMMARY OF THE INVENTION

The present invention is a method for detecting and isolating fault modes in a system having a model describing its behavior and one or more measurements that are sampled regularly. In this method, said models are used to calculate past and present deviations from measurements that would result from said system with no faults, as well as from said system with one or more potential said fault modes. Algorithms that calculate and store these deviations, along with memory of when said faults, if present, would have an effect on the said actual measurements, are used to detect when a fault is present. Related algorithms are used to exonerate false fault modes and finally to isolate the true fault mode.

A novel, effective, and efficient filtering method for estimating the derivative of a noisy signal is presented. This method is relevant to one application at hand, the FDI of spacecraft thruster faults using gyros, in which angular acceleration is estimated from the noisy gyro measurements. The use of this filtering algorithm, storage of a number of measurements, correlation of this historical record with a similar record of when the faults are active or inactive, use of exoneration algorithms, and integration of the entire FDI system comprise the novel aspects of the invention.

DETAILED DESCRIPTION OF THE INVENTION

Figure 1:
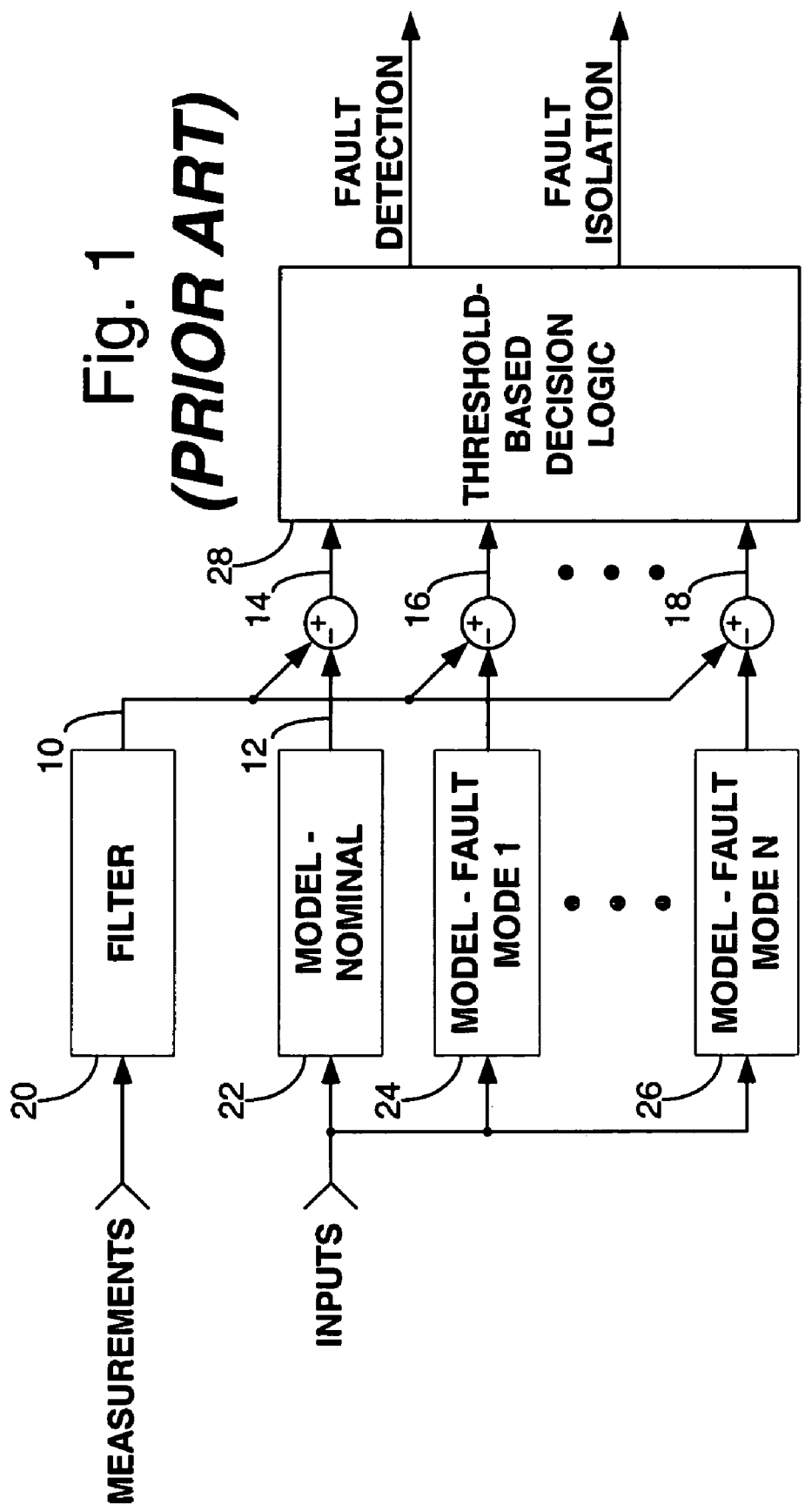
FIG. 1 is a block diagram indicating the signals and steps used in FDI, as used in the prior art, where a separate model is used to calculate the deviation from measurement for each potential fault mode.

In FIG. 1, which shows a type of FDI in the prior art which is used as a basis for the present invention, measurements are processed following a measurement update (or set of measurements) by the filter element, 20, producing the estimated actual system outputs, 10. Inputs to the models, 22, 24, and 26, may include actuator commands, state variables, etc. 22 is an accurate model of the nominal system. 24 is a model of the system in which fault mode 1 is present. Additional models will be used to represent each potential fault mode, up to mode N, modeled by 26. The model outputs from 22 are the predicted system outputs—nominal, 12, which are compared with 10 to produce the deviation from measured—nominal, 14. Similarly, the fault mode models result in the deviation from measured—fault mode 1, 16, and the deviation from measured—fault mode N, 18. The idea of this and many approaches to FDI, including the present invention, is to compare the measurements with a number of potential fault modes, choosing the fault mode that matches the measurements most closely as the true fault. One commonly used statistically based method for choosing which is closest is based on maximum likelihood theory, as explained in the prior art cited earlier. This threshold-based decision logic, 28, results in both fault detection and fault isolation decisions.

Figure 2:
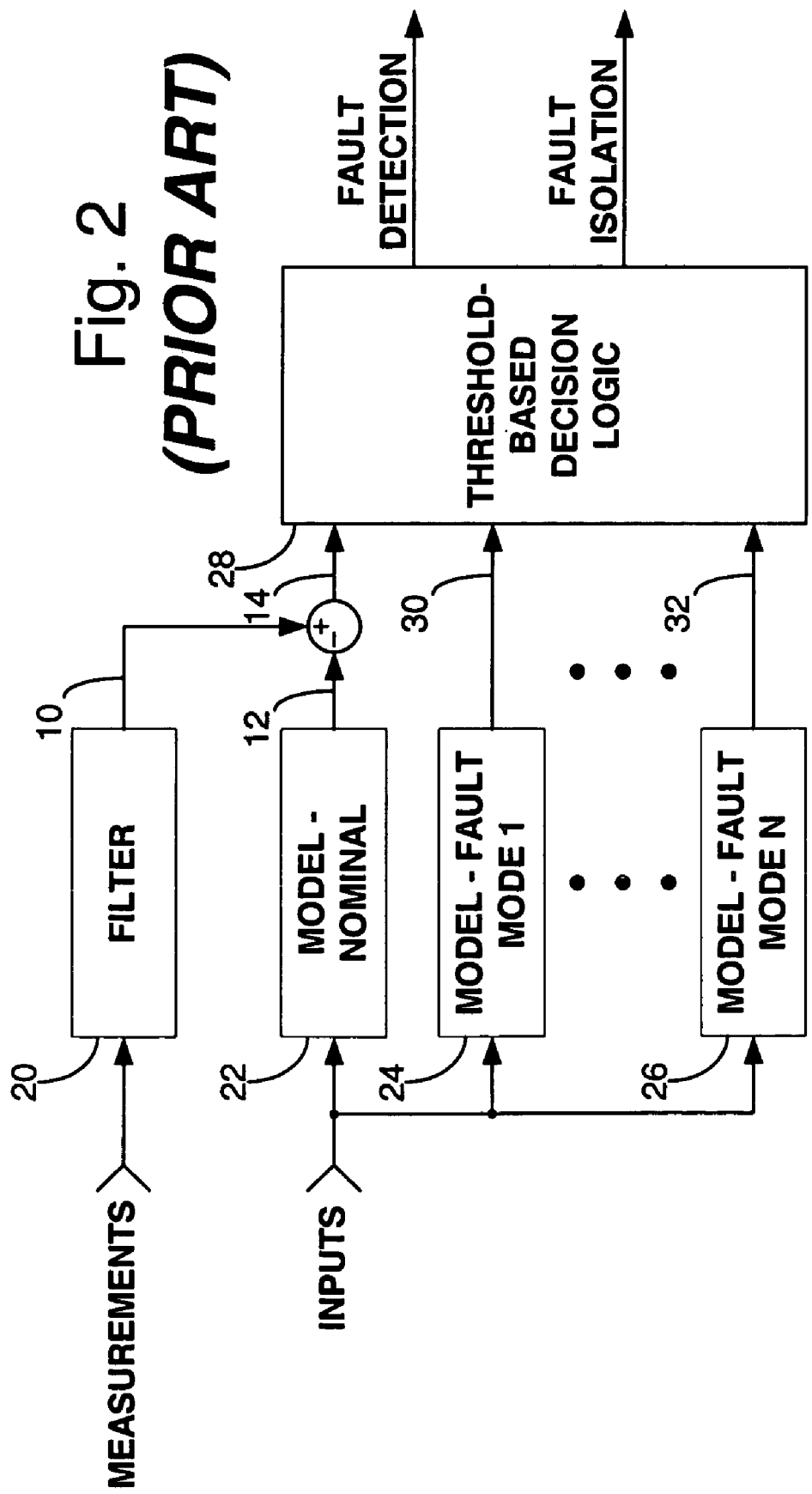
FIG. 2 is a block diagram indicating the signals and steps used in FDI, as used in the prior art, where a separate model is used to calculate the expected deviation from nominal for each potential fault mode.

In FIG. 2, also in the prior art, a slightly modified type of FDI is shown. While 14 is still calculated as before, the outputs from the various fault-mode models, 24 and 26, are the Expected Deviation from Nominal—fault mode 1, 30, and the Expected Deviation from Nominal—fault mode N, 32. Thus models 24 and 26 can be made far simpler than their counterparts in FIG. 1.

In FIG. 1, Deviation from measured—fault mode 1 is the deviation of the measured outputs from the outputs that would be predicted if fault mode 1 were true, so it is derived from the measurements. In FIG. 2, which may be chosen for the enhanced calculation efficiency if the specific application allows it, the actual measurements are used only once—to calculate the deviation from that predicted by the nominal model. The Expected Deviation From Nominal—Fault mode 1 is a value that is calculated, or may be looked up from a pre-calculated table, based on the inputs only. For example, if the inputs indicate that the mode will not be active at that time, the expected deviation would be zero, whereas if active it would be a pre-calculated value or vector of values. The similarity of the two approaches can be demonstrated by observing that 16 can be calculated as 14 plus 30. The subsequent 28 will be adjusted accordingly, depending on which of the two input approaches is used. The first one is more general, while the second one, when applicable, offers the potential for significant improvement in computational complexity with no loss of information. For simplicity, the invention is presented using the method of FIG. 2, but the first method could be applied with appropriate minor modifications in the subsequent processing.

Figure 3:
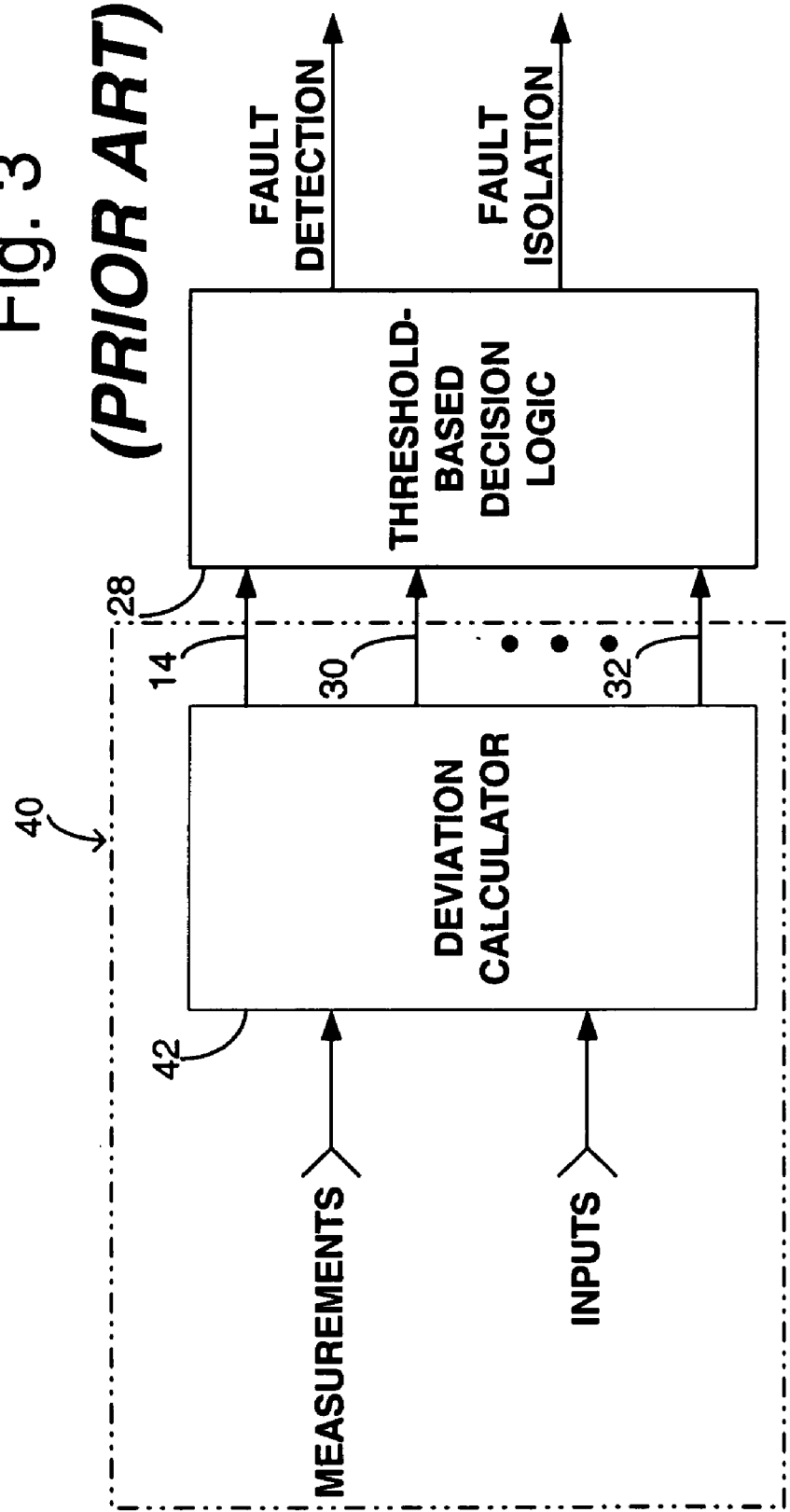
FIG. 3 is a block diagram indicating a summarized portion of FIG. 2, which is prior art, and is used as part of the present invention.

FIG. 3, also prior art, shows certain elements taken from FIG. 2 and summarized as the functional block, 42, which is the deviation calculator. Taking in measurements and inputs, it calculates 14, 30, and 32, which contain all the information on deviations of the various potential fault mode models. 42 and its inputs and outputs, collectively, 40, the deviation calculator subsystem, is used directly as a component in the present invention and no novelty is claimed for that portion of the invention.

Figure 4:
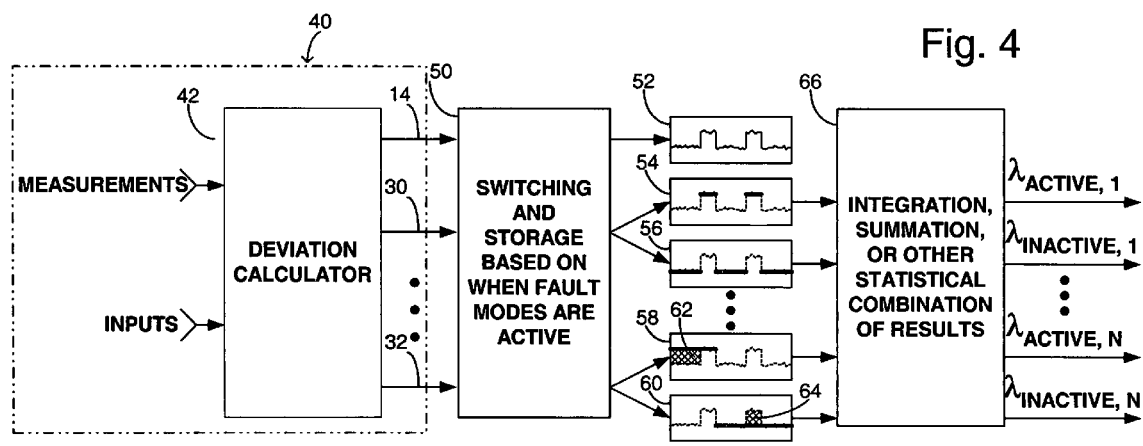
FIG. 4 is a signal-flow block diagram indicating the algorithmic processing used to generate the likelihood parameters.

FIG. 4 shows how the outputs of 40 are processed to produce the likelihood parameters for each fault mode. One of the key concepts of the invention is to improve accuracy by explicitly checking the data at times when the fault mode, if present, should be causing a deviation from nominal, as well as checking at times when it should not be causing any deviation, even if it is present. Two terms are introduced to facilitate explanation of this concept: that of a fault mode being "active" or "inactive." A fault mode is said to be active at a particular time if it would affect the system behavior if the mode were true. For example, if fault mode 1 is thruster number 1 failed off, and thruster 1 is commanded to fire, then fault mode 1 is active. A fault mode is said to be inactive if it would not affect the system behavior even if it were true. Continuing the previous example, if thruster 1 is not commanded to fire, then fault mode 1 is inactive. Throughout this specification, the words "active" and "inactive" are used with these meanings only. Specifically "active" means that the effect of the fault mode would be observable if it were true, and conversely, "inactive" means that the effect would be unobservable, even if true. Since it is assumed that exactly one fault mode is true (possibly representing multiple faults), if a significant deviation from nominal is measured at a time when a fault mode is inactive, it implies that a different fault mode must be true, thereby indicating that the fault mode in question should be exonerated. Similarly, if no deviation from nominal is measured at a time when a particular fault mode is active, it implies that this fault mode should be exonerated. Due to system disturbances unrelated to the faults, and noise in the measurements, the decisions to exonerate or isolate faults are generally carried out following application of these basic concepts through statistical-based filtering on windows of historical data, rather than on data at a single point in time. However, in the case of a system with sufficiently low disturbances and noise, application with a window size of 1 (thus acting on one measurement vector at a time) is possible.

Another key concept of the invention is to record a history of past and present deviation calculations. Functional block 50 provides switching and storage based on when fault modes are active. Variably sized windows are used to collect data in several different bins, corresponding to: the deviation of the measurements from nominal, 52; the expected deviation from nominal—fault mode 1 at times when fault mode 1 is active, 54, or inactive, 56; and the corresponding windows of data for all fault modes up through the last one, N, 58 and 60.

In FIG. 4, all 5 windows shown appear to be the same length; however, they can be variable length. Also, the data here are all one-dimensional, as if a single sensor is present, or all measurements are combined to produce a single deviation value at each point in time; however more generally, the deviations will be vectors of measurements at each point in time. The independent variable here could be time or some other variable.

Some example data is shown, corresponding to the case where fault mode 1 is true. 52 is drawn as a noisy signal that steps up briefly at two distinct times in the window of data. This noisy signal is drawn again as a dashed line in 54, 56, 58, and 60, where the expected deviations from nominal are also plotted. In this example, it is clear that fault mode 1 is the true fault mode since the expected deviations match the measured deviations at all times, including when fault mode 1 is active and inactive. Region 62 in 58 shows the extent to which the expected deviation from nominal—fault mode N deviates from the measured deviation from nominal, in the window, at times when fault mode N is active. Region 64 in 60 shows the corresponding value for times when fault mode N is inactive. The values corresponding to the deviations indicated by 62 and 64 are calculated according to the appropriate statistics related to the problem at hand, choosing from options of: summation, integration, combination of elements at different times and different locations in the measurement vector by mean, median, sum of squares, root sum of squares, etc., all of which may be weighted according to the appropriate statistics, for example inversely weighted by the estimated measurement error covariance matrix. The specific methods used for this are carried out in 66, are problem-dependent, and no novelty is claimed in the specifics of that function. The output of 66 is a likelihood parameter corresponding to each fault mode, separated into times when it is either active or inactive. The term "likelihood parameter" is derived from the maximum-likelihood theory that may be the preferred method to apply in 66, although in general, these are parameters to be chosen by an application-dependent method, so long as they reflect the closeness of match between the corresponding fault modes and the expected and measured deviations, at both active and inactive times, on an appropriately chosen window in time or other independent variable. In the preferred embodiment, maximum likelihood theory is used, as this has been found to work well on the spacecraft thruster FDI application.

Figure 5:
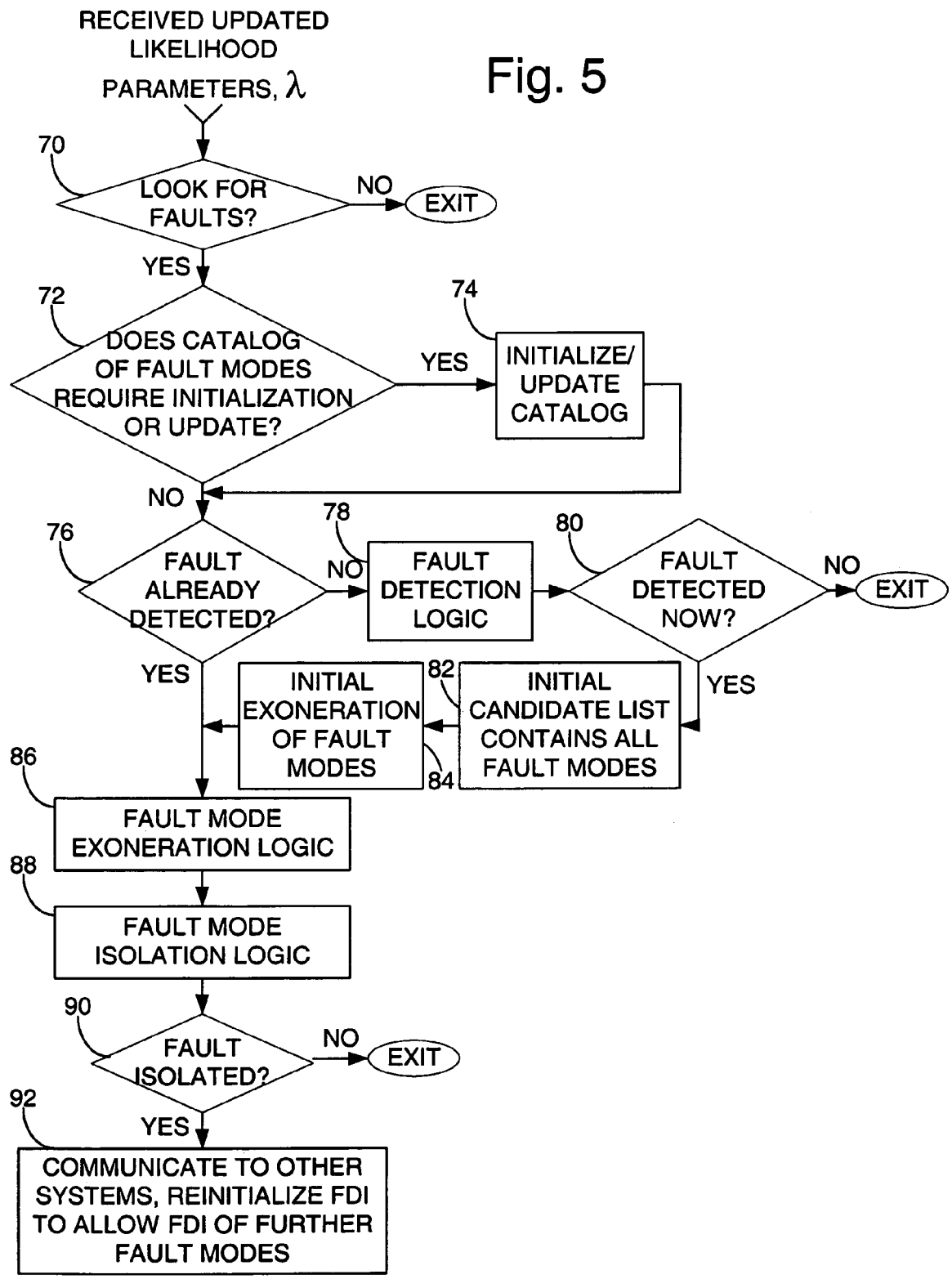
FIG. 5 is a flow chart of a sample program used to implement the FDI method.

FIG. 5 is a flowchart outlining the specific program logic executed each time an updated set of likelihood parameters is generated. For the spacecraft thruster FDI application example, this occurs following each thruster control period—a period during which all thrusters are held either on or off. Decision block 70, checks to see whether FDI is enabled. It may be appropriate to disable FDI updating at times when it is known that the sensors are excessively noisy, system disturbances are excessively high, etc. The remainder of the flowchart elements are described as part of the following detailed description of the invention as applied to spacecraft thruster FDI.

DETAILED DESCRIPTION—AS APPLIED TO SPACECRAFT THRUSTER FDI

The FDI method is described in detail as follows, using the spacecraft thruster FDI application as an example. Unless otherwise stated, the specifics of the method refer to the preferred embodiment.

At every control update, the disturbing acceleration on the spacecraft, $\hat{a}_{disturbing}$, 14, is calculated. This vector is compared with the vector of expected disturbing accelerations corresponding to each possible fault mode, $a_{disturbing,i}$, 30 and 32, in 42. After a fault is detected in 78, and once a clear match is determined in 88, the fault mode is isolated. Specifics regarding filtering and other calculations follow.

Decision block 72 checks to see if the fault mode catalog requires initialization or update. If so $a_{disturbing,i}$, 30 and 32, is pre-calculated in 74 for every possible fault mode, i. Fault modes consisting of a plurality of atomic fault modes require further cataloging of each combination of faults that may be active at each time (for example, if jets 1 and 2 fail off simultaneously, the disturbing acceleration will be different for the three different firing permutations: #1 firing, #2 firing, and both #1 and #2 firing). This cataloging may be done pre-flight, and the values are may be updated periodically if the system model changes. This occurs in the spacecraft example if the nominal strength of all thrusters drops as the tanks empty or if updated mass- and thruster-property estimates become available.

Decision block 76 checks to see if a fault has already been detected. If true, isolation will be pursued. If false, the fault detection logic is tested in 78. If a fault is still not detected following 78, decision block 80 will exit the FDI processing until an updated set of likelihood parameters is received. If a fault is detected in 80, the initial list of candidate faults is populated in 82 with all potential fault modes, and followed by an immediate exoneration of as many as possible in 84. Details on this exoneration procedure follow later.

$\hat{a}_{disturbing}$, 14, the difference between the acceleration estimate based on measurements, and the acceleration expected based on the physical spacecraft model and thruster commands is calculated as follows. $\alpha_{known-system,k}$ and $$x^{body}_{known-system,k}$$

are the physical-model based estimates of what the angular and translational accelerations should be at control update, k. This pair of 3-by-1 vectors is combined to create $a_{known-system}$, a 6-by-1 vector. They are calculated assuming no failures are present and all physical parameters are at their known values (nominal or identified, but not necessarily true). Thus, if an on-line identification method produced a better estimate of some system parameters than the nominal parameters, those may be used. Starting with the basic spacecraft rotational and translational equations of motion, making appropriate substitutions, and assuming translational accelerations are measured in the body frame, the nominal accelerations are expressed as follows, where: ω is a 3-by-1 vector containing the angular velocity of the body-fixed frame with respect to an inertial reference frame; I, is a 3-by-3 matrix containing the spacecraft inertia tensor (also, dyadic, matrix), measured about the true center of mass; the caret indicates estimated or identified quantities; L is a 3-by-n matrix containing x-y-z location of each thruster in the body frame; n is the number of thrusters; N is the number of fault modes; D is a 3-by-n matrix containing unit vectors indicating the direction of thrust in the body frame; $F_{nom}$ is a n-by-n diagonal matrix containing nominal strength of each thruster at full tank pressure; $T_k$ is a n-by-1 vector of 1's and 0's containing effective value for which thrusters fire at time step k, accounting for transient effects; $\tau_{disturb}$ is a 3-by-1 vector containing sum of all torques on the vehicle resulting from other sources (drag, gravity gradient, separately modeled known thruster anomalies, CMG, RWA, and other calculable dynamic effects, etc.); m is a scalar containing total vehicle mass;

$$f_{disturb}^{body}$$

is a 3-by-1 vector containing the net force on the vehicle through the center of mass, and the body superscript indicates measurement in the body frame:

$$\dot{\omega} = I^{-1}((L \times D)F_{nom}T_k + \tau_{disturb} - \omega \times (I\omega)) \quad (1)$$

$$\ddot{x}^{body} = m^{-1}(DF_{nom}T_k + f_{disturb}^{body}) \quad (2)$$

$$\alpha_{known-system,k} = \hat{I}^{-1}((\hat{L} \times D)F_{nom}T_{command,k} + \hat{\tau}_{disturb} - \omega \times (\hat{I}\omega)) \quad (3)$$

$$\ddot{x}_{known-system,k}^{body} = m^{-1}DF_{nom}T_{command,k} + \hat{f}_{disturb}^{body} \quad (4)$$

The disturbing accelerations, 14, can then be calculated as:

$$\hat{a}_{disturbing} \stackrel{\Delta}{=} \hat{a} - a_{known-system} = \begin{bmatrix} \hat{\alpha}_{disturbing} \\ \hat{\ddot{x}}_{disturbing}^{body} \end{bmatrix} \quad (5)$$

$$\stackrel{\Delta}{=} \begin{bmatrix} \hat{\alpha} - \alpha_{known-system} \\ \hat{\ddot{x}}^{body} - \ddot{x}_{known-system}^{body} \end{bmatrix}$$

$\hat{\alpha}$ may be estimated from the measurements using the derivative filtering method presented later, otherwise, $\hat{\alpha}$ and $\hat{\ddot{x}}^{body}$ should be estimated from the measurements using the best means possible that does not rely on knowledge of thruster properties, and that produces a value correlated with the thruster performance during the control period (i.e., not time-shifted). If both gyros and accelerometers are present (or some other method for estimating angular and translational accelerations), then FDI can proceed using all 6 degrees of freedom; however, the FDI can proceed with whatever subset of these 6 measurements is available.

Collecting, windowing, and filtering measurements for individual fault modes. If the signal-to-noise ratio were high enough and each fault mode signature ($a_{disturbing,i}$) were unique (or sufficiently separable in the noise present), maximum likelihood FDI analysis of the $\hat{a}_{disturbing}$ readings could be carried out on the values at each time step, as was done by Deyst in the prior art. However, this is often not possible due to: excessive sensor noise; unknown system model variations; disturbances; and the existence of fault modes with similar $a_{disturbing,i}$. To address this, the data is collected and windowed as follows:

Collecting relevant similar measurements prior to filtering is done in 50—for example, collecting $\hat{a}_{disturbing}$ estimates for cases when only jet #3 was commanded to fire. The need for collection is highlighted by the case in which a failed-off thruster might be commanded to fire infrequently for short durations. The information about the failure may be detectable if this data is collected and examined together, whereas it may not be sufficiently persistent to be detected by a more conventional approach. Collection is implemented as follows: the single $\hat{a}_{disturbing}$ vector is stored at all times; the history of each fault mode being active or inactive (and sub-mode information for the multi-jet case) is also stored.

Windowing these collections of measurements is also done in 50 to enable detection of an abruptly appearing thruster fault, while also allowing accurate isolation once a fault is detected. To maximize the noise reduction from filtering, it would be good to maximize the window size. However, this will compromise the detection of abrupt faults—if the filter uses data from before the fault occurred, as well as afterwards. Optimal selection of the window size used for fault detection requires consideration of the noise reduction needed, the acceptable time before detection, as well as the relative costs of false positives and failed detection (risk optimization). Also, a minimum number samples of active data is required before maximum likelihood FDI analysis is allowed to proceed for a given fault mode.

The windowing situation changes slightly following detection. Since the problem statement says that only a single fault mode (possibly affecting multiple jets) will appear, once it is detected, the window can begin at the time of detection and grow without bound. To gain a few extra samples, conservative analysis can allow a number of samples before detection, reasoning that the fault was present for some time prior to detection. These extra samples may be important in allowing fast fault isolation.

However, the calculation of $\lambda_{inactive,i}$ following detection keeps a finite sliding window. The rationale for this may become clearer when $\lambda_{inactive,i}$ is discussed, but basically this measurement is intended to spike up when the true fault becomes active, thus allowing this fault to be declared false. Since the true fault mode is not known, the best window for $\lambda_{inactive,i}$ calculation cannot be known. The best that can be done is to continue to use a sliding window and to hope that the true fault will appear for long enough during that window to raise $\lambda_{inactive,i}$ above the prescribed threshold and allow for this fault to be declared false. In cases where the basic signal-to-noise ratio in the calculation of 14 varies in time, it may be beneficial to adjust the window sizes and minimum-sample requirements to enable the decision making to use more data. Increasing these parameters will result in slower detection and isolation, but will improve accuracy.

Once the data has been collected and windowed in 50, it is statistically combined, or filtered in 66 to reduce the effects of noise in the calculation of the likelihood parameters. Since it is known that failures will occur abruptly, this windowing and filtering method is preferred over an infinite impulse response (IIR, e.g., exponential) filter that would carry through information for longer. The implementation as described here avoids introducing any phase lag between the cause (thruster firings) and effect (vehicle motions), as would be introduced by a linear IIR or Kalman Filter, that would bias the FDI.

One of the challenges of FDI for systems with on-off actuators is that failures are only observable when active. For example, "off" failures are observable only when the jets are commanded to fire. For each fault mode, only the relevant $\hat{a}_{disturbing}$ measurements, 14 and 52, are used to calculate $\hat{a}_{disturbing,active,i}$ and $\hat{a}_{disturbing,inactive,i}$, which are in-turn used to calculate $\lambda_{active,i}$, $\lambda_{inactive,i}$, and $\lambda_{inactive,i0}$. So $\hat{a}_{disturbing,active,i}$ is calculated as the mean over a window of $\hat{a}_{disturbing}$ data during which fault mode i was active, and $\hat{a}_{disturbing,inactive,i}$ uses $\hat{a}_{disturbing}$ data during which fault mode i was not active.

The preferred embodiment for 66 uses maximum likelihood theory. Although the acceleration estimator is nonlinear and sub-optimal, it is reasonable to assume that the estimated disturbing acceleration readings, $\hat{a}_{disturbing}$, are normally distributed about the disturbing acceleration values, $a_{disturbing,*}$, corresponding to the true fault mode. So the probability density for the true disturbing acceleration values, $a_{disturbing,*}$, conditioned on the measurement history M, is [Deyst 1976] [Gelb 1974]

$$p(a_{disturbing,*} \mid M) = \qquad (6)$$
$$(2\pi)^{-n_{dof}/2} |P_a|^{-1/2} e^{-\frac{1}{2}([a_{disturbing,*}-\hat{a}_{disturbing}]^T P_a^{-1} [a_{disturbing,*}-\hat{a}_{disturbing}])}$$

$n_{dof}$ is the number of degrees of freedom used in the FDI, and $P_a$ is the estimation error covariance of the disturbing acceleration. When multiple measurement samples are considered, the probabilities multiply:

$$p(a_{disturbing,*} \mid M) = \prod_k (2\pi)^{-n_{dof}/2} |P_a|^{-1/2} \qquad (7)$$
$$e^{-\frac{1}{2}([a_{disturbing,*}-\hat{a}_{disturbing}]^T P_a^{-1} [a_{disturbing,*}-\hat{a}_{disturbing}])}$$
$$= (2\pi)^{-n_{dof} k_{max}/2} |P_a|^{-k_{max}/2}$$
$$\prod_k e^{-\frac{1}{2}([a_{disturbing,*}-\hat{a}_{disturbing}]^T P_a^{-1} [a_{disturbing,*}-\hat{a}_{disturbing}])}$$
$$= (2\pi)^{-n_{dof} k_{max}/2} |P_a|^{-k_{max}/2}$$
$$e^{-\frac{1}{2}\sum_k ([a_{disturbing,*}-\hat{a}_{disturbing}]^T P_a^{-1} [a_{disturbing,*}-\hat{a}_{disturbing}])}$$
$$= (2\pi)^{-n_{dof} k_{max}/2} |P_a|^{-k_{max}/2} e^{-\frac{1}{2}\lambda_{active,j}}$$

The summation over k indicates the use of measurements at k different times, with the size of this window determined as described above.

Given disturbing acceleration measurements, $\hat{a}_{disturbing}$, and knowing the disturbing acceleration values corresponding to each possible fault mode, $a_{disturbing,i}$, the most likely fault mode is found by finding the $a_{disturbing,i}$ that maximizes this probability density function. The subscript i indicates the fault mode number corresponding to the disturbing acceleration. This function is maximized when the likelihood argument, $\lambda_{active,i}$, in the following expression is minimized:

$$\lambda_{active,i} = \sum_k (a_{disturbing,i} - \hat{a}_{disturbing,active,i})^T \qquad (8)$$
$$P_a^{-1}(a_{disturbing,i} - \hat{a}_{disturbing,active,i})$$

If $P_a^{-1}$ is diagonal (as it commonly is assumed to be), the calculation may be simplified by bringing the $P_a^{-1}$ term out of the summation. Since different $\lambda$'s are calculated using different numbers of samples, each $\lambda$ is normalized by dividing by the number of samples used to calculate it.

This expression is calculated and used both to detect and to isolate failures. When fault mode i is true, there will be a close match between $a_{disturbing,i}$ and $\hat{a}_{disturbing,active,i}$, resulting in a low value for $\lambda_{active,i}$. Calculation of $\lambda_{active,i}$ may be halted once a fault mode has been isolated. Alternatively, it may continue, ensuring validation of the isolation decision, or the FDI process may be re-initialized following isolation to detect and isolate further faults.

The approach taken in the prior art [Deyst 1976] basically makes this above calculation of $\lambda_{inactive,i}$, without the preceding collection, windowing, and filtering. It is then used directly for fault detection and isolation, without the following $\lambda_{inactive,i}$ calculations and additional post-processing.

The likelihood argument, $\lambda_{inactive,i}$, is calculated using data from periods where the fault mode was inactive, as follows:

$$\lambda_{inactive,i} = \sum_k (a_{disturbing,inactive,i} - \hat{a}_{disturbing,inactive,i})^T \qquad (9)$$
$$P_a^{-1}(a_{disturbing,inactive,i} - \hat{a}_{disturbing,inactive,i})$$

$a_{disturbing,inactive,i}$ is the disturbing acceleration that would be expected if fault mode i were true, when fault mode i is inactive. This is zero, allowing for simplification to $$\lambda_{inactive,i} = \sum_k (\hat{a}_{disturbing,inactive,i})^T P_a^{-1} (\hat{a}_{disturbing,inactive,i}) \qquad (10)$$

The likelihood parameter, $\lambda_{inactive,i}$ is used to exonerate fault modes following detection and prior to isolation, so it does not need to be calculated at other times.

When fault mode i is true, $\lambda_{inactive,i}$ will have a low value, just as $\lambda_{active,i}$ does. However, when fault mode i is not true, it will have a high value whenever the true fault mode is active, and a low value at other times. The $\lambda_{inactive,i}$ values are monitored for spikes, and when the value exceeds a threshold, fault mode i is exonerated, and removed from consideration as a candidate from that point forward (note that this processing occurs only after fault detection).

The likelihood parameter, $\lambda_{active,i0}$, is calculated using data from periods where fault mode i was active, as follows:

$$\lambda_{active,i0} = \sum_k (0 - \hat{a}_{disturbing,active,i})^T P_a^{-1} (0 - \hat{a}_{disturbing,active,i}) \quad (11)$$

$\lambda_{active,i0}$ measures the likelihood that $\hat{a}_{disturbing,active,i}$ could have resulted even though no failures (none at all, not just that fault mode i is not true) were present (that is why $a_{disturbing,i}=0$). When fault mode i is true, $\lambda_{active,i0}$ will have a high value, and when no failures are present, it will have a low value. The ratio between $\lambda_{active,i}$ and $\lambda_{active,i0}$ is monitored to detect faults, as follows:

At each FDI update, for each possible fault mode, $\lambda_{active,i}$ is evaluated using the windowed readings. The likelihood argument corresponding to no failure, $\lambda_{active,i0}$, is evaluated using the same windowed relevant readings, but with zero substituted for $\alpha_{disturbing,i}$. So $\lambda_{active,i0}$ should be low (a close match) when no fault mode (including i) is true. The ratio of likelihood arguments is calculated as $$\lambda_{ratio,i} \triangleq \frac{\lambda_{active,i}}{\lambda_{active,i0}} \quad (12)$$

A fault is detected in 78 when $\lambda_{ratio,i}$ falls below a threshold; this is a generalized likelihood ratio test. The calculation of $\lambda_{active,i0}$ and use of the ratio in fault detection (as compared to using a fixed threshold for $\lambda_{active,i}$) is less susceptible to an incorrect $P_a$ value and distortion by other fault modes (e.g., when fault mode j is active, it will affect calculations of $\lambda_{active,i}$ and $\lambda_{inactive,i}$). Further tests are then performed before isolating a particular fault mode, as described below. Evaluation of individual $\lambda_{active,i0}$'s for each fault mode is critically important—evaluating $\lambda_{active,0}$ based on all (windowed) data may not indicate a failure if a failed-off thruster has not fired recently.

Immediately following fault detection in 78, the finite list of possible fault modes is analyzed to see if any can be exonerated in 84. For example, if a fault mode has never been active since the initialization of the FDI system, it can be exonerated at this time. Once a fault mode is exonerated, no further calculations of likelihood parameters are required.

Then, and again at each FDI update, the likelihood arguments, $\lambda_{active,i}$ and $\lambda_{inactive,i}$, are calculated using all relevant data since the time of detection and compared to certain thresholds and to each other. If a fault mode is true, both $\lambda_{active,i}$ and $\lambda_{inactive,i}$ should be low, indicating the fault mode i fits the data well when it is both active and inactive. This is used first to exonerate fault modes in 86—if $\lambda_{active,i}$ or $\lambda_{inactive,i}$ ever rise above a threshold (as they would whenever the data does not match well with fault mode i being true), fault mode i is exonerated.

This additional step that allows for fault modes to be exonerated is important for improving the speed and accuracy of the FDI. In some cases, a fault is correctly identified by process of elimination—all other fault modes are exonerated. Analysis and removal of false fault modes that are similar to the true one enables more discriminating decision thresholds to be set, improving accuracy.

For a fault to be isolated in 88, $\lambda_{active,i}$ must be below a "low" threshold, indicating a very close match, while no other faults are below a higher threshold.

Some faults are virtually indistinguishable from one another in terms of the resulting $\hat{a}_{disturbing}$. Unfortunately, it is not uncommon for mode activations to be synchronized due to the control system. For example, consider two jets, A and B, that are physically opposite one another (i.e., the acceleration vectors are opposite). If A fails off it may be commanded to fire continuously since no control thrust is produced and B is not likely to be fired at all since it would be pushing in the opposite direction. In this situation, the fault modes for both jet-A-off and jet-B-on are active. So in the extreme limit where the nominal accelerations from A and B are identical and the activations are exactly synchronized, it is mathematically impossible (the information is not there) to distinguish between these two fault modes.

Another alias problem occurs in cases a plurality of thrusters are fired open-loop in sets of multiple thrusters at a time and sets of them have near-identical fault signatures. This can be addressed by adjusting the firing pattern to isolate the failed thruster, once the failure has been identified, the pattern is left in a state that makes the failure inactive, providing reconfiguration as well as FDI in this case. FDI-driven excitation of fault modes such as this example is generally valuable in expediting the isolation.

Following isolation in 88, one approach may be to assume that this was the only fault mode that will appear (as presented in the problem statements for the various spacecraft), and that the isolation was done correctly. This would enable the halting of all FDI monitoring calculations. However, if further verification is desired, it is possible to continue to calculate and monitor the likelihood parameters (perhaps with modified windowing) to see if the isolation decision was incorrect. Alternatively, additionally, or subsequently, once a fault mode is isolated, it may be accepted as a true fact. At this point, the entire FDI monitoring system may be re-initialized with this knowledge, as in 92, enabling detection and isolation of other fault modes.

Application of the present invention to thruster FDI is based fundamentally on analysis of the vehicle acceleration that results during thruster firings. The estimated acceleration, $\hat{a}$ (consisting of estimated angular acceleration, $\hat{\alpha}$ and estimated translational acceleration, $\hat{x}^{body}$), is required at each FDI update. If it is not directly measurable, it must be estimated. In one application, one would estimate $\hat{a}$ using rate gyros and translational accelerometers, but the choice of sensors and the estimation method used are both independent of the FDI method. If it can be assumed that the thrust is constant during each control sample period, and the FDI algorithm requires estimates of accelerations corresponding to these control sample periods, then it is therefore important that any significant phase lag produced by the estimation method be avoided, as that would distort the estimated correlation between the thruster command and resulting acceleration. It is also important that the estimation method accounts for the fact that thruster faults may be present—and does not make use of thruster knowledge in the estimation.

A novel approach was developed to provide accurate angular acceleration estimates from the gyro signals. In this approach, the segment of raw gyro readings covering the control segment of interest (during which thrust should be constant) is low-pass filtered with a forward-backward zero-phase smoothing filter to remove high frequency structural vibrations and vibration-induced ringing of the gyro's tuning fork. A line is then fit using a linear least squares regression to the smoothed result, with the slope of the line providing the angular acceleration estimate. Since it used only samples taken during the thruster firing of interest, the estimate is thus properly correlated with the thruster firing that caused it. Also, no reliance on thruster properties was made in the estimate.

This approach for estimating acceleration by determining the slope of a line fit to the velocity data clearly generalizes to a method for computing the average derivative across a segment of samples.

Since one of the ways to implement this FDI is as part of a real-time processing system, it is desirable to implement this derivative filter using as little code memory, processor cycles, and software development time as possible. A novel approach was developed that takes advantage of the fact that both low-pass filtering and least-squares line fitting act as linear operations on the data, meaning that the combination of the two is also linear. This means that the two-step procedure can be implemented as a single vector multiplication of a vector of filter coefficients with the data segment. Further, the vector of filter coefficients can be determined through a process whereby each point, one at a time, is set to one and the two-step filter process output then equals the value of the corresponding coefficient.

Having shown preferred embodiments for the general form of the invention and as applied to a specific application, those skilled in the art will realize many variations are possible which will still be within the scope and spirit of the claimed invention. Therefore, the scope of the invention is to be limited only as indicated by the following claims.

The invention claimed is:

1. A method for detecting and isolating intermittently observable fault modes in a system having models describing its behavior and one or more measurements that are sampled regularly, said method comprising:
    (a) said models and computing capacity to calculate past and present measurements that would result from said system with no faults, as well as from said system with one or more potential fault mode candidates;
    (b) algorithms to calculate and store deviations between said calculated measurements and either actual measurements or an abstraction of said actual measurements as returned by a filtering function;
    (c) detection algorithms using said calculated deviations at times or states comprising present and historical data to declare when one of said fault mode candidates or anomalies in the data un-related to said fault modes becomes possible;
    (d) exoneration algorithms using said calculated deviations to remove certain fault mode candidates from consideration as a potential fault mode, thereby making the decision making in the final step simpler and more robust; and
    (e) isolation algorithms using said calculated deviations to declare which one of remaining said potential fault mode candidates is the true fault mode.

2. The method of claim 1, wherein the system is controlled with on-off actuators and the fault modes are hard-off or hard-on actuator faults.

3. The method of claim 1, wherein the system is a thruster-controlled spacecraft, and the fault modes are thruster faults.

4. The method of claim 3, wherein the method is implemented on-board said spacecraft using the main spacecraft processor.

5. The method of claim 3, wherein the method is implemented on-board said spacecraft using a secondary processor communicating with said main spacecraft processor.

6. The method of claim 3, wherein the method is implemented off-board said spacecraft, including at a ground station, performing said calculations based on telemetry from said spacecraft, and communicating the results back to said spacecraft.

7. The method of claim 3, wherein said measurements are obtained from one or more of the following sensors: gyroscopes of all varieties, accelerometers, star trackers, sun sensors, horizon sensors, video cameras, directional antennae, radar, and other measurements that directly or indirectly relate to spacecraft motions.

8. The method of claim 1, wherein said model or models are adapted to match system outputs during periods where no failures are present, as with a neural network.

9. The method of claim 1, further including the case where it is implemented sequentially, whereby once a fault mode is correctly detected and isolated, said method is re-initialized with this information to enable detection and isolation of any subsequently occurring faults.

10. The method of claim 1, wherein the application is to a system where a real-time controller exists, to be implemented either on the real-time processor, on a secondary processor as part of the system, on a processor that is separate from the system, or by manual implementation of said method, where communication of required signals and results would occur for the latter two instances.

11. The method of claim 1, further including the case where excitation logic is used to dynamically adjust system inputs to improve the ability of said method to discern between a plurality of candidate fault modes, with said adjustments made as to minimize any negative impact on overall system performance.

* * * * *